(12) United States Patent
Ballou

(10) Patent No.: US 6,692,710 B1
(45) Date of Patent: Feb. 17, 2004

(54) METHOD FOR OBTAINING MAGNESIUM BY LEACHING A LATERITE MATERIAL

(75) Inventor: Brian J. Ballou, Voyenenga (NO)

(73) Assignee: Crew Development Corporation, Hovik (NO)

( * ) Notice: Subject to any disclaimer, the term of this patent is extended or adjusted under 35 U.S.C. 154(b) by 0 days.

(21) Appl. No.: 09/743,151

(22) PCT Filed: Aug. 14, 1998

(86) PCT No.: PCT/NO98/00241

§ 371 (c)(1), (2), (4) Date: Mar. 22, 2001

(87) PCT Pub. No.: WO00/03044

PCT Pub. Date: Jan. 20, 2000

(30) Foreign Application Priority Data

Jul. 8, 1998 (NO) ................................................ 983150

(51) Int. Cl.$^7$ .................................................. C01F 5/00
(52) U.S. Cl. ................. 423/165; 423/150.1; 423/150.4; 423/163; 423/497; 423/498; 423/637
(58) Field of Search ................................ 423/165, 163, 423/159, 160, 140, 141, 142, 150.1, 150.4, 419.1, 497, 498, 637

(56) References Cited

U.S. PATENT DOCUMENTS

| | | | | |
|---|---|---|---|---|
| 2,105,456 A | * | 1/1938 | Hubler et al. | |
| 4,006,215 A | | 2/1977 | Hall et al. | |
| 4,800,003 A | * | 1/1989 | Peacey et al. | 423/163 |
| 5,571,308 A | | 11/1996 | Duyvesteyn et al. | |

FOREIGN PATENT DOCUMENTS

| | | | |
|---|---|---|---|
| CA | 1024353 | | 1/1978 |
| DE | 142328 | * | 6/1980 |
| DE | 3037754 | * | 4/1982 |
| JP | 61-31314 | * | 2/1986 |
| JP | 1-115817 | * | 5/1989 |
| WO | WO 99/06603 | | 2/1999 |

* cited by examiner

*Primary Examiner*—Steven Bos
(74) *Attorney, Agent, or Firm*—Barry R. Lipsitz

(57) ABSTRACT

The present invention provides methods for the isolation and production of magnesium products from leaching of laterite material with acid. A magnesium compound is formed by downstream treatment of a leach stream after at least one of nickel or cobalt have been brought into solution. Magnesite is then obtained by adding at least one of alkali metal or alkaline earth metal carbonate to the leach stream. The magnesite may be converted into magnesium chloride by adding an acid, such as HCL.

17 Claims, No Drawings

METHOD FOR OBTAINING MAGNESIUM BY LEACHING A LATERITE MATERIAL

This application is a national stage filing of international application PCT/NO98/00241 filed Aug. 14, 1998, which was published under PCT Article 21 (2) in English.

The present invention relates to a method for the isolation and production of magnesium metal, magnesium chloride and magnesium-based products from the leaching of laterite material, the use of a method for the leaching of laterite material to isolate magnesium-based products, and magnesium-based products which are isolated according to the aforementioned method.

Accordingly, a method is provided which produces magnesium and various magnesium-based products from the leaching of laterite materials.

JP 54155999 describes a method for introducing a gas containing $CO_2$ into a slurry of nickel-containing ore in order to extract magnesium oxide therefrom. The improvement comprises the addition of NaCl to the slurry to facilitate the extraction of magnesium oxide. The slurry is obtained by (1) calcination of nickel-containing ore at 500–800° C. or selective reduction-calcination of nickel contained in the ore in order to obtain calcined ore, and the addition of calcined ore to water or (2) heating the ore to 500–800° C. for selective reduction-calcination of the nickel contained therein in order to obtain calcined ore, contacting the calcined ore with an aqueous solution of ammonia containing free sulphur in order to extract useful metals such as nickel therefrom, and the addition of resulting extracted residue to the water. In one example, nickel ore was calcined at 500–700° C. for one hour. The resulting calcined ore was added to an aqueous solution of 1 g/l NaCl in order to obtain a slurry. The waste gas containing 10% $CO_2$ was introduced into the slurry to extract magnesium oxide therefrom.

WO 81/02153 describes the production of magnesium oxide of high purity and high surface area. A method is described for the production of MgO from a solution of metal sulphate including $MgSO_4$ which comprises precipitating metals from the solution other than Mg, such as hydroxides, separating the solution from the precipitate, concentrating the separated solution to a specific gravity of from about 1.35 to 1.5 so that impurities including calcium sulphate are precipitated, separating the concentrated solution from the precipitate, isolating the dehydrated $MgSO_4$ crystals from the concentrated solution and decomposing the dehydrated $MgSO_4$ crystals in order to form MgO. Accordingly, a method is described for refining magnesium and nickel-containing ore comprising grinding the ore, preparing a solution of ground ore in sulphuric acid containing less than 10% water, adding water to the slurry of acid-ore in an amount effective to initiate a sulphating reaction, using the heat in the sulphating reaction to heat the slurry of acid-ore, whereby water-soluble metal sulphates and insoluble residue are formed. Leaching the sulphating product with water to extract water-soluble metal sulphates in solution, followed by separation of the metal sulphate solution from the insoluble residue. Metals other than Mg are then precipitated as hydroxides. The solution is separated from the metal hydroxide precipitate, and the solution is concentrated sufficiently to precipitate $CaSO_4$. The concentrated solution is then separated from the precipitate and dehydrated $MgSO_4$ crystals are isolated from the concentrated solution. Dehydrated $MgSO_4$ crystals are broken down to form MgO having a controlled surface area.

DE 2906808 describes a method for isolating nickel from laterite ore, especially having a high magnesium content. This is done by leaching with sulphuric acid whereby the separated leaching solution is neutralised and the heavy metals are separated from the solution. The magnesium sulphate containing solution is at least partly evaporated and the crystallised magnesium sulphate separated. The separated magnesium sulphate is heated in a reduced atmosphere during the formation of sulphur dioxide, water vapour and magnesium oxide, and sulphuric acid is produced from derived sulphur dioxide and is fed back into the leaching step.

U.S. Pat. No. 5,571,308 describes a method for isolating nickel from laterite ore containing large quantities of magnesium and iron. The ore is referred to as saprolitic ore and is subjected to leaching with a mineral acid from the group consisting of HCl, $H_2SO_4$ and $HNO_3$. After leaching with HCl, the solution is separated from undissolved solid substances and nickel is preferably isolated by contacting the solution with a resin selective for nickel absorption. The residue contains iron and magnesium chloride which may be subjected to pyrohydrolysis in order to produce their respective oxides and free HCl for recirculation into the leaching system. The nickel is extracted from the resin by using a stripper solution of said acid, and nickel is then extracted from the nickel-loaded stripper solution.

DE 3140380 describes a method for isolating nickel by a sulphuric acid leaching of a nickel-containing oxidic feedstock which also contains magnesium and iron, with the simultaneous production of magnesium oxide and cement. The method comprises reacting the magnesium sulphate containing refinate, at a pH of between 7 and 8.5, a temperature of less than 100° C. and a magnesium sulphate concentration of less than 25%, with carbon dioxide and ammonia, wherein magnesium carbonate or hydroxide carbonate, as the case may be, is precipitated and an ammonium sulphate solution is formed. The precipitated product is separated from the ammonium sulphate solution and calcined to magnesium oxide, carbon dioxide being formed. Carbon dioxide is fed back to the precipitation step. A gypsum slurry is formed from the ammonium sulphate solution by adding burned calcium, and ammonia is released. Ammonia is then fed back to the precipitation step. Whilst additives are added, the gypsum slurry is dried and burned to give cement clinker. The sulphur-containing gas which is generated through the cement burning is converted in a sulphur factory to sulphuric acid and which at least partly is fed back into the feedstock leaching.

Consequently, the leaching of laterite material in order to isolate metals is not a new process. However, where nickel-containing laterites are concerned, the target metals from leached laterite materials have to date been nickel and cobalt. The leaching process used to isolate nickel and/or cobalt from nickel laterite ore also dissolves other metal ions. One of these ions is magnesium which is used inter alia in alloying with aluminium. With today's known technology, the magnesium production is a high-energy process.

Accordingly, the present invention relates to a method for the isolation and production of magnesium metal, magnesium chloride, magnesite and magnesium-based products from the leaching of laterite material, characterised in that magnesium metal, magnesium chloride and magnesite are isolated from any step during the leaching of the laterite material.

According to the method in the present invention, magnesium metal, magnesium chloride and magnesite are isolated after natural magnesium compounds in naturally occurring laterite have been dissolved.

The method according to the present invention is further characterised in that magnesite is produced in any step in the leaching of the laterite material by adding $NaCO_3$ and/or $CaCO_3$ to the leaching solution, after natural magnesium compounds in naturally occurring laterite have been dissolved. The use of a method for the leaching of laterite material to isolate magnesium-based products is also described.

In known laterite leaching processes, magnesium oxide in the laterite material is kept at as low a level as possible because it is deemed to be a cost-increasing element in the processing and is also considered as waste. By using the present method, valuable magnesium-based by-products are produced from any step in the laterite process. The essential feature is to add sufficient acid to cause all the components in the material, including magnesium compounds, to dissolve so that desired ore minerals are then extracted from this solution. The magnesium-based products can be produced from any laterite leaching process. Consequently, the present invention makes it possible to isolate magnesium metal and other magnesium-based products which have previously gone to waste from known processes for leaching laterite material. Owing to the fact that MgO is considered to be an acid consumer in the leaching process and consequently leads to increased costs in the production of nickel and cobalt according to known methods for leaching laterite materials, it is at present kept at as low a level as possible. In the production of magnesium metal from laterite ore according to the present invention, it will be possible for the ore to contain larger amounts of MgO which in turn yield higher amounts of nickel.

Today, acid leaching technology is operated at different pressures and temperatures. In some cases atmospheric temperatures and pressures are used, whilst in other processes elevated pressures and temperatures are employed.

When magnesium is in solution from any of the various leaching processes, the production according to the present invention of identified magnesium products can be carried out.

When magnesium is in solution, according to the invention sodium carbonate ("soda ash") is added and this produces magnesite

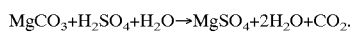

$MgCO_3 + H_2SO_4 + H_2O \rightarrow MgSO_4 + 2H_2O + CO_2$.

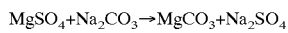

$MgSO_4 + Na_2CO_3 \rightarrow MgCO_3 + Na_2SO_4$

Below are exemplary embodiments showing examples of methods for isolating magnesium-based products from the leaching of laterite material according to the present invention.

EXAMPLE 1

A bulk sample of ore is mixed and dried in a furnace at 100° C. It is then mixed in a drum. From this, 1 kg of dry laterite ore is taken out and leached at atmospheric pressure in $H_2SO_4$ at boiling temperature, 100° C., for eight hours. Water is added to 500 g of $H_2SO_4$ to obtain a total slurry volume of four litres. The leaching solution is filtered in a Buchner filter so that the liquid is filtered from the solid material. The acid liquid is then adjusted to a pH of 2.5–3.5 using NaOH and impurities are precipitated. Ni, Co and Mg are now in solution. The liquid is filtered again from the solid material. 500 ml of liquid is passed into a flask and stirred with a magnetic mixer. 25 g/l $Na_2S$ is pipetted under the surface of the liquid. This results in the precipitation of Ni and Co from the solution with sodium sulphide as a source of hydrogen sulphide, and the formation of mixed sulphides of Ni and Co. The liquid is filtered once more from the solid material. The pH is increased to 4.5 by adding $Na_2O_2$. This precipitates out fewer impurities and Mg is now in solution. The liquid is then filtered from the solid material. For the precipitation of $MgCO_3$, $Na_2CO_3$ is added and the pH is below 6.0. $MgCO_3$ is filtered and dried. For additional purification $H_2SO_4$ is added again and $MgCO_3$ is precipitated again with $Na_2CO_3$.

Production of MgO $MgCO_3$ is calcined in a furnace at about 900° C. $CO_2$ is released and used again for precipitation of $MgCO_3$ with $Na_2CO_3$. This results in the precipitation of MgO.

Production of $MgCl_2$

MgO is dissolved in HCl in order to form a 35% $MgCl_2$ solution. Hydrated $MgCl_2$ is crystallised from the solution by using supersaturation on volume reduction due to boiling.

EXAMPLE 2

450 g dry laterite material containing 2.4% Mg is mixed with 225 g concentrated sulphuric acid and water is added in order to give a total volume of 1.5 litres. This slurry is leached under pressure for three hours at 255° C. Once the reaction is finished, the pressure autoclave is cooled to room temperature and reacted slurry is removed. The slurry is then filtered in a Buchner filter to separate the solid material from the liquid. 500 ml of filtered liquid is placed in a glass container and stirred. To simulate recirculation/neutralisation parameters, the liquid is doped with about 100 g of solid magnesium sulphate to produce an equivalent level consisting of 20 g/l Mg. The pH is increased to 2.0 by using an NaOH solution. Sodium sulphide solution is then added to remove Ni and Co as sulphides. The resulting slurry is filtered. The solution from the sulphide precipitation step is then treated with 5 g solid MgO to increase the pH to 4.5 and increase the Mg content of the solution. 30 g sodium peroxide is then added to the solution, whilst the pH is maintained at the same level by adding small quantities of sulphuric acid. This increases the ORP of the solution to about 655 mV in relation to AgCl and allows efficient precipitation of impurities such as iron. The resulting slurry is filtered.

The liquid from the preceding step is then treated with 670 ml of a solution consisting of 100 g/l sodium carbonate. This is added until a pH of 9.0–9.5 is reached. Magnesium is effectively precipitated from the liquid as magnesium carbonate (magnesite). The resulting slurry is filtered to separate solid material from the liquid. About 30 g of dry magnesium carbonate was produced by using this procedure.

To produce magnesium chloride, 20 g magnesium carbonate is reacted with 75 ml of concentrated HCl. This mixture is heated and agitated in a container on a hot plate in order to dissolve the magnesium carbonate. The solution is then filtered. The clear filtrate is boiled in order to cause the magnesium chloride crystals to precipitate on account of supersaturation. The resulting slurry is filtered. 20 g solid magnesium chloride was produced by using this procedure.

To produce magnesium oxide, 5 g of magnesium carbonate is added to a scarification crucible. This material is then transferred to a furnace at 900° C. for two hours. Carbon dioxide is removed and the remaining solid substance is magnesium oxide. As a result, about 2.40 g magnesium oxide was produced.

Consequently, the present invention describes a method for producing magnesium metal and magnesium-based products from the processing of laterite nickel ore. In the processing of laterite nickel ore, magnesium is in solution and precipitation according to the present invention can then result in the production of magnesium-based products and magnesium metal. This represents a considerable advance and involves great savings in costs in comparison with other methods for the production of magnesium. Magnesium metal is inter alia produced from native magnesite or sea water. The high costs involved in the production of magnesium metal are due to the fact that any process requires the magnesium ion to be released from the host and often requires it to be dissolved. The fact that magnesium is dissolved in known processes for leaching laterite materials means that the magnesium production according to the present invention from waste substances is very favourable economically speaking. After magnesium has been dissolved according to any conventional leaching process, it is precipitated by adding $Na_2CO_3$ and/or $CaCO_3$ or by electrodepositing or electrolysis, according to the present invention. Magnesite is used inter alia as an additive in cement, and magnesite brick is used in most industrial furnaces. In known leaching processes, an attempt is made to avoid MgO in the feedstock because it increases the costs of production of nickel and cobalt. Changes in technology, chiefly in the autoclaving part of the process, have made the leaching process more favourable, economically speaking, for the production of nickel and cobalt, and consequently also for the production of magnesium metal, magnesium chloride, magnesite and magnesium-based products according to the present invention.

What is claimed is:

1. A method for isolation and production of magnesium compound from leaching of laterite material with acid, comprising the steps of:
    a) forming the magnesium compound by downstream treatment of a leach stream after at least one of magnesium, nickel or cobalt have been brought into solution; and
    b) obtaining magnesite by adding at least one of alkali metal or alkaline earth metal carbonate to said leach stream;
        wherein the magnesite is isolated after naturally occurring magnesium compounds in naturally occurring laterite have been dissolved.

2. A method according to claim 1, wherein in step b $Na_2CO_3$ is used as the carbonate.

3. A method according to claim 1, wherein in step b $CaCO_3$ is used as the carbonate.

4. A method according to claim 1, wherein the magnesite is isolated after said at least one of nickel or cobalt have been removed from the leach stream.

5. A method according to claim 1, wherein the magnesite is isolated before said at least one of nickel or cobalt are removed from the leach stream.

6. A method for isolation and production of magnesium compound from leaching of laterite material with acid, comprising the steps of:
    a) forming the magnesium compound by downstream treatment of a leach stream after at least one of magnesium, nickel or cobalt have been brought into solution;
    b) obtaining magnesite by adding at least one of alkali metal or alkaline earth metal carbonate to said leach stream, and
    c) converting the magnesite to magnesium chloride by adding acid.

7. A method according to claim 6, wherein said acid comprises HCl.

8. A method according to claim 6, wherein in step b $Na_2CO_3$ is used as the carbonate.

9. A method according to claim 6, wherein in step b $CaCO_3$ is used as the carbonate.

10. A method according to claim 6, wherein the magnesite is isolated after said at least one of nickel or cobalt have been removed from the leach stream.

11. A method according to claim 6, wherein the magnesite is isolated before said at least one of nickel or cobalt are removed from the leach stream.

12. A method for isolation and production of magnesium compound from leaching of laterite material with acid, comprising the steps of:
    a) forming the magnesium compound by downstream treatment of a leach stream after at least one of magnesium, nickel or cobalt have been brought into solution;
    b) obtaining magnesite by adding at least one of alkali metal or alkaline earth metal carbonate to said leach stream, and
    c) converting the magnesite into magnesia by calcining.

13. A method according to claim 12, further comprising the step of converting the magnesia to magnesium chloride by:
    dissolving said magnesia in HCL to form a magnesium chloride solution; and
    crystallizing $MgCl_2$ from the solution by boiling said solution.

14. A method according to claim 12, wherein in step b $Na_2CO_3$ is used as the carbonate.

15. A method according to claim 12, wherein in step b $CaCO_3$ is used as the carbonate.

16. A method according to claim 12, wherein the magnesite is isolated after said at least one of nickel or cobalt have been removed from the leach stream.

17. A method according to claim 12, wherein the magnesite is isolated before said at least one of nickel or cobalt are removed from the leach stream.

* * * * *